XR 3,770,909

United States Patent [11] 3,770,909
Rose et al. [45] Nov. 6, 1973

[54] APPARATUS FOR PLAYBACK OF SOUND FROM MICROFICHE

[76] Inventors: Charles R. Rose, 5710 Harbord Dr., Oakland, Calif. 94611; Geroge E. Artiano, 5622 Maxwelton Rd., Oakland, Calif. 94618

[22] Filed: Apr. 21, 1972

[21] Appl. No.: 246,354

[52] U.S. Cl.. 179/100.3 B, 178/DIG. 2, 178/6.7 R, 350/96 B

[51] Int. Cl. .......................... G11b 7/12, H04m 5/84

[58] Field of Search ........... 179/100.3 B, 100.2 MD, 179/100.2 T; 178/6.7 A, 6.7 R, 6.6 A, DIG. 2; 350/96 B; 250/227, 229 Q, 219 QA, 219 FT, 219 D, 219 FR

[56] References Cited

UNITED STATES PATENTS

| | | | |
|---|---|---|---|
| 3,255,357 | 6/1966 | Kapany | 250/219 QA |
| 1,746,407 | 2/1930 | Schroter | 178/6.7 R |
| 2,644,857 | 7/1953 | Pierre | 179/100.3 A |
| 3,167,612 | 1/1965 | Strickholm | 350/96 B |
| 3,569,616 | 3/1971 | Baker | 178/DIG. 2 |
| 3,325,594 | 6/1967 | Goldhammer et al. | 250/227 X |
| 3,240,106 | 3/1966 | Hicks | 178/DIG. 2 |
| 3,314,075 | 4/1967 | Becker et al. | 178/6.7 R |
| 2,648,589 | 8/1953 | Hickman | 179/100.2 T |

*Primary Examiner*—Raymond F. Cardillo, Jr.
*Attorney*—James R. Cypher

[57] ABSTRACT

An apparatus consisting briefly of a light source, a circular to linear scanner comprising a plurality of optic fibers, a microfiche recording, a linear to circular condenser comprising a plurality of optic fibers, an optical focusing lens, a photo detector, an amplifier and speakers.

1 Claim, 6 Drawing Figures

3770909
OR IN 179/100.3B

APPARATUS FOR PLAYBACK OF SOUND FROM MICROFICHE

BACKGROUND OF THE INVENTION

This invention is used to play back recordings produced by an apparatus described in our co-pending application Ser. No. 246,356, filed Apr. 21, 1972 entitled APPARATUS FOR RECORDING SOUND ON MICROFICHE.

SUMMARY OF THE INVENTION

The gist of the present invention is the use of an optical playback focusing system for reproducing sound from a microfiche format.

An object of the present invention is to provide a playback system in which there is no physical contact between the sound track portions of the microfiche and the playback system thereby eliminating any wear of the microfiche and concomitant distortion of the sound; as is the case with magnetic tape or disc recording playback systems.

A further object is to provide a playback system in which the microfiche can be encased in plastic such that the light/sound source will be protected from injury such as scratching during handling and storage which could result in distortion or noise in reproduction of the sound.

Still another object is to provide an optical sound playback system which will produce approximately 30 minutes of uninterrupted sound from a microfiche format, such as a standard 4 × 6 inches microfiche, with high fidelity characteristics adaptable to stereophonic, or multiple track formats, compatible with present day acceptable standards of high fidelity sound reproduction.

A still further object is to provide a playback unit which will be easily useable with present day high-fidelity amplification systems.

Another object is to provide a playback format which will not be subjected to problems of warping which affect discs, nor will it stretch or break or suffer magnetic field interference as will magnetic tape.

Still another object is to provide a playback format which will permit the storage of a great many selections in a minimum space yet provide means for easy indexing and retrieval.

Another object is to provide a playback format which is less expensive than other playback formats, does not require cassettes or cartridges which are subject to mechanical failure and is not subject to breakage such as some discs.

A still further object is to provide a film recording which is almost impossible to duplicate satisfactorily except from the original master so as to prevent pirating which by estimates set forth in the Wall Street Journal dated Dec. 9, 1971, is believed to be in the order of $250 million in world-wide volume.

BRIEF DESCRIPTION OF THE PREFERRED EMBODIMENTS OF THE INVENTION

Figure 1:
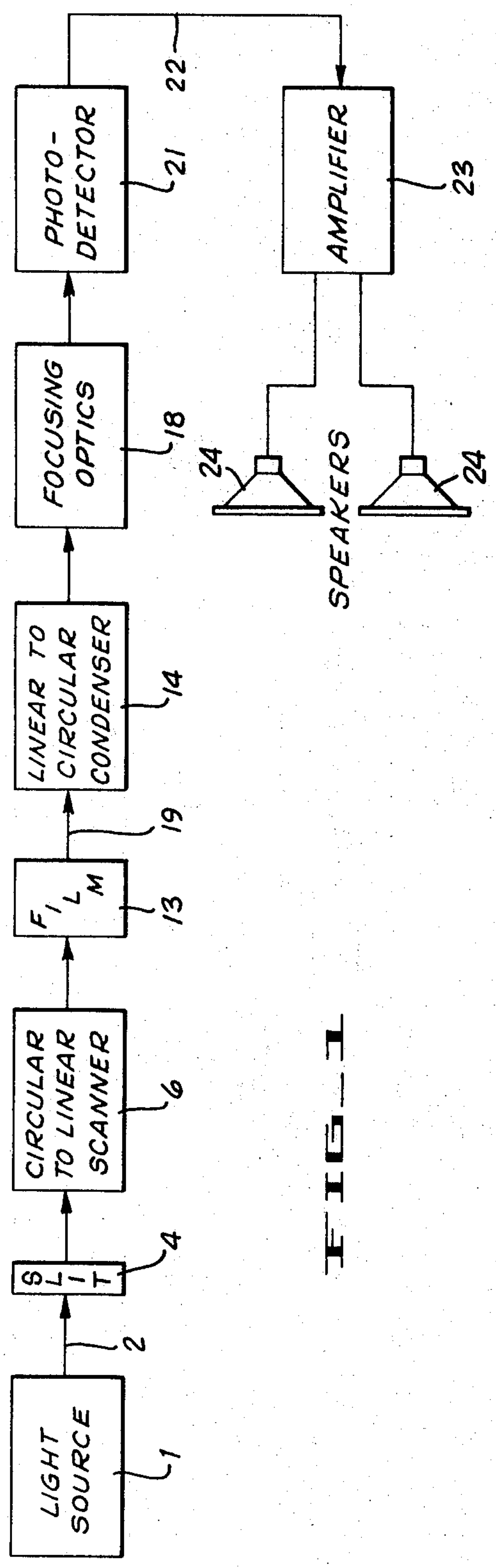
FIG. 1 is a schematic of the playback system of the present invention.
Figure 4:
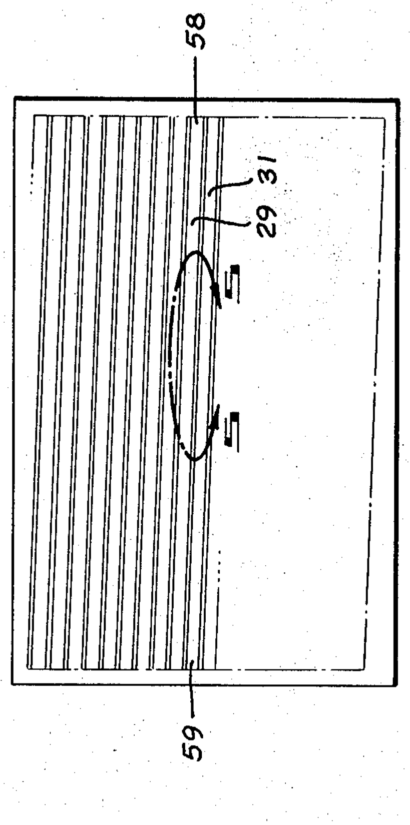
FIG. 4 is a plan view of a microfiche showing the format of the recording indicia thereon.
Figure 5:
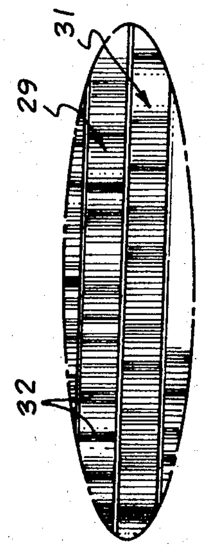
FIG. 5 is a greatly enlarged view of a portion of the microfiche shown substantially along the line 55 of FIG. 4.

The apparatus of the present invention for producing sound from a visual image source consists briefly of a high intensity light source 1 producing a light beam 2; a member 3 having a slit 4 therein for passing the beam therethrough; a first plurality of transmitting optic fibers 6 arranged with their first ends 7 in a closed curvilinear line 8 and their second ends 9 in an open line pattern 11; optical means 12 mounted adjacent the slit for sequentially projecting the beam upon each of the first fiber optic ends; an elongated recorded film 13 movably located adjacent the second ends of the fibers for receiving the beam thereon; a second plurality of receiving optic fibers 14 arranged with their first ends 16 in spaced registration with the second ends of the first plurality of optic fibers and their second ends 17 arranged in a compact pattern; and optical focusing means 18 mounted adjacent the second ends of the second plurality of optic fibers for receiving the image 19 from the film and focusing the image; the last named image being focused on a photo detector 21 wherein a signal 22 is passed to an audio amplifier 23 which in turn is transmitted to a speaker system 24.

Figures 2, 3, 6:
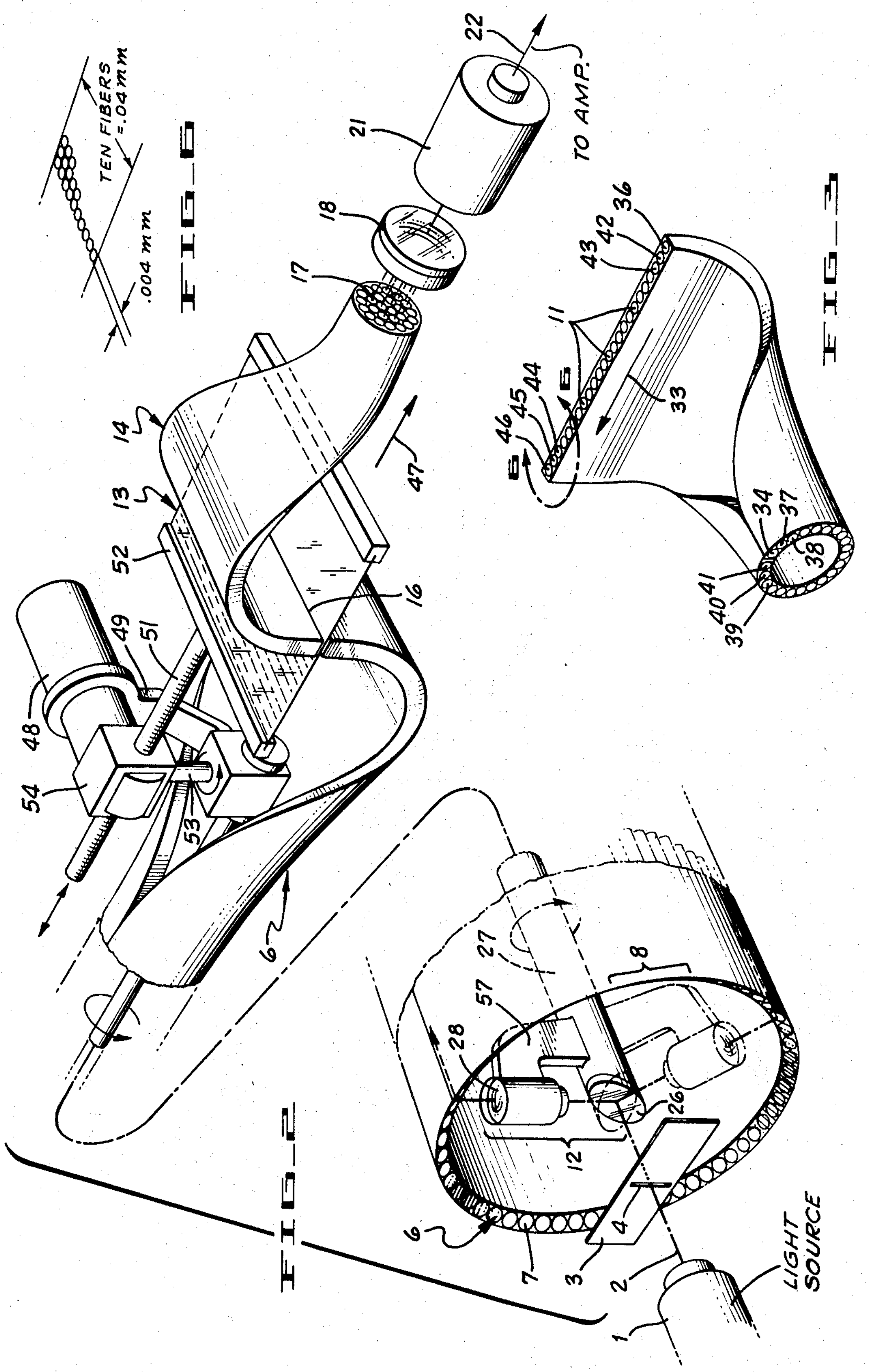
FIG. 2 is a perspective view of a portion of the device constructed in accordance with the present invention with a portion separated from the body of the main portion of the apparatus and rotated 90° to more clearly show the inner workings of the device. A dash-dot line indicates the proper assembly of the apparatus.
FIG. 3 is a perspective view of a portion of the apparatus of the present invention shown in FIG. 2.
FIG. 6 is a greatly magnified portion of the apparatus shown in FIG. 3 taken along line 6—6.

The beam from the light source after passing through the slit is projected into the end of a single optic fiber by means of various optic systems. One such system is shown in FIG. 2 and consists of a mirror 26 placed on the end of a rotating shaft 27. The mirror is formed at an angle to the axis of the shaft 27 and reflects the beam to lens 28 which focuses the beam on one of the ends of the optic fibers. As shown, the faces of the first ends are planar and are angularly related to the initial longitudinal axis of the optic fiber. For ease in construction, an angle of 45° of the mirror and optic fibers is preferred.

The beam is projected as a bar of moving light on the recorded film where it illuminates the lines such as lines 29 and 31 and the image lines 32.

FIG. 3 shows a more detailed view of the first plurality of optic fibers which may be referred to as the circular to linear scanner. As shown in the example, the bar of light moves in the direction of the arrow 33. Light, for example, enters optic fiber end 34 and leaves at end 36. In like manner, light enters ends 37, 38 and on across to ends 39, 40 and 41 and leaves respectively by ends 42, 43, 44, 45 and 46. It is understood that the fibers are insulated from one another as is done in standard optic fiber practice.

The recorded film is moved constantly in the direction of arrow 47 and is synchronized with the rotation of the mirror 26. One means for synchronizing the movement is to provide a single motor 48 mounted on a bracket 49. The motor shaft drives a threaded shaft 51 connected to a film holder 52 as by a worm gear not shown. The motor drives shaft 53 through a right angle gear means 54 which in turn drives shaft 27 through right angle gear means 56. As may be noted in FIG. 2, lens 28 is mounted on a bracket 57 connected to the rotating shaft 27. It is to be understood that the means for synchronization is by way of example only and could be accomplished in various ways.

The second plurality of optic fibers, sometimes referred to as the Linear to Circular Condenser is shown in FIG. 2. Here, the individual optic fibers at their first end are arranged in coaxial registration with the second ends of the optic fibers in the Circular to Linear Scanner. The simplest construction is to form the first ends of the Condenser and the second ends of the Scanner in a straight line. The image is focused on the photo detector which activates an amplifier which in turn produces sound through the speakers.

The playback of the sound from the microfiche is continuous and uninterrupted because of the unique elements and movement of the parts. The images on the film are printed in lines which are angled slightly to the edges of the film. Thus when the bar of moving light reaches end 58 of line 29, it instantly reappears at end 59 of line 31.

The resolution requirements for the microfiche film may be calculated as follows: Assuming the size of the microfiche is to be 4 inches by 6 inches with the recording across the 6-inch dimension, and a maximum frequency of 30,000 cycles across the 6 inches and a playback time of 20 minutes at one line per second, the cycle width at 30,000 cycles is calculated as follows. The line width of 6 inches is divided by 30,000 cycles, and this gives a cycle width of $2 \times 10^{-4}$ inches. The resolution requirements are therefore calculated by dividing 1 inch by the cycle width of $2 \times 10^{-4}$ and the conversion factor of 25.4 which equals 198 lines per millimeter. This is well within the resolution requirements of the microfiche film which at the present time is about 300 lines per millimeter.

The line width for a 20-minute playback, assuming that each line is scanned in 1 second, is calculated by dividing the 4-inch length of the card by 20 minutes $\times$ 60 seconds per minute, or a line width of $3.33 \times 10^{-3}$ inches. The resolution requirement of the line width is therefore calculated by dividing 1 inch by $3.33 \times 10^{-3} \times 25.4$ (the conversion factor) giving a resolution factor of 12 lines per millimeter.

The optical fiber size of $5.08 \times 10^{-4}$ millimeter is calculated, using the following assumptions: For a 3 percent distortion at 10,000 cycles, the slit width should be equivalent to one-thirtieth of the cycle width at that frequency. The cycle width at 10,000 cycles is calculated by dividing 6 by $1 \times 10^4$ giving a cycle width of $6 \times 10^{-4}$ inches. The slit width for a 3 percent distortion is therefore arrived at dividing $6 \times 10^{-4}$ by $3 \times 10$ giving a slit width of $2 \times 10^{-5}$ inches. The size of the fiber is obtained by looking to the slit width. This is calculated by multiplying the slit width of $2 \times 10^{-5}$ by 25.4 (the conversion factor) giving a size of fiber of $5.08 \times 10^{-4}$ millimeters in diameter.

The film advancement speed is obtained from the previous calculations wherein the rate of scanning is to be one line per second with a line width for a 20-minute playback of $3.33 \times 10^{-3}$ inches. The advancement speed is therefore obtained by multiplying the line width of $3.33 \times 10^{-3}$ by 60 giving a speed of 0.1998 inches per minute.

The speed at which the mirror is turning is 60 revolutions per minute which is obtained by the assumption that the scanning time for each line is 1 second.

Referring to FIG. 6, it may be seen that each optic fiber 6 is actually 0.004 millimeters in diameter and the width of the scanner is actually 0.04 millimeters in width with 10 optic fibers in a roll across the width of each scanner shown in FIG. 2 and as shown in FIG. 3.

We claim:

1. An apparatus for producing sound from a visual image source comprising:

a. a high intensity light source producing a light beam;

b. a member having a slit therein for passing said beam therethrough;

c. a first plurality of transmitting optic fibers arranged with their first ends in a closed curvilinear line and their second ends in an open line pattern;

d. optical means including a rotatable shaft and a mirror mounted thereon for rotation adjacent said slit for receiving said light beam and sequentially reflecting said beam, said optical means including a lens mounted on said shaft for rotation therewith for receiving said light beam reflected from said mirror, and reducing focusing and projecting said beam sequentially upon the first ends of said optic fibers;

e. an elongated recorded film movably located adjacent the second ends of said fibers for receiving said beam thereon;

f. a second plurality of receiving optic fibers arranged with their first ends in spaced registration with the second ends of said first plurality of optic fibers and their second ends arranged in a compact pattern;

g. optical focusing means mounted adjacent the second ends of said second plurality of optic fibers for receiving the image from said film and focusing said image; said last named image being focused on a photo detector wherein a signal is passed to an audio amplifier which in turn is transmitted to a speaker system; and h. means for moving said recorded film and operatively connected to said rotatable shaft of said optical means for synchronizing the movements of said mirror, lens and recorded film.

* * * * *